United States Patent
Yao et al.

(10) Patent No.: US 11,185,086 B2
(45) Date of Patent: Nov. 30, 2021

(54) PACKAGED AMBIENT COFFEE BEVERAGE WITH AERATED TEXTURE UPON HAND SHAKING

(71) Applicant: NESTEC S.A., Vevey (CH)

(72) Inventors: Yuan Yao, Fujian (CN); Zhongwei Sun, Fujian (CN); Song Zengfeng, Fujian (CN); Alexander A. Sher, Dublin, OH (US)

(73) Assignee: Societe des Produits Nestle S.A., Vevey (CH)

( * ) Notice: Subject to any disclaimer, the term of this patent is extended or adjusted under 35 U.S.C. 154(b) by 627 days.

(21) Appl. No.: 16/080,731

(22) PCT Filed: Feb. 28, 2017

(86) PCT No.: PCT/EP2017/054604
§ 371 (c)(1),
(2) Date: Aug. 29, 2018

(87) PCT Pub. No.: WO2017/148920
PCT Pub. Date: Sep. 8, 2017

(65) Prior Publication Data
US 2021/0186045 A1    Jun. 24, 2021

(30) Foreign Application Priority Data

Mar. 1, 2016 (WO) ................ PCT/CN2016/075198

(51) Int. Cl.
*A23F 5/24* (2006.01)
*A23F 5/40* (2006.01)
*A23F 5/42* (2006.01)

(52) U.S. Cl.
CPC ................ *A23F 5/243* (2013.01); *A23F 5/40* (2013.01); *A23F 5/42* (2013.01)

(58) Field of Classification Search
CPC ............... A23F 5/243; A23F 5/40; A23F 5/42
See application file for complete search history.

(56) References Cited

U.S. PATENT DOCUMENTS

| | | | |
|---|---|---|---|
| 2002/0037353 A1* | 3/2002 | Villagran | ................ A23L 27/72 426/590 |
| 2004/0170727 A1 | 9/2004 | Howard et al. | |
| 2006/0040034 A1* | 2/2006 | Zeller | ................ A23L 29/30 426/564 |
| 2011/0020512 A1 | 1/2011 | Masutake et al. | |
| 2012/0164277 A1* | 6/2012 | Robinson | ................ A23L 33/10 426/72 |
| 2013/0209659 A1* | 8/2013 | Racenet | ................ A61L 31/145 427/2.1 |

FOREIGN PATENT DOCUMENTS

| | | |
|---|---|---|
| WO | 2015185372 | 12/2015 |
| WO | 2015185544 | 12/2015 |
| WO | 2015185545 | 12/2015 |

* cited by examiner

*Primary Examiner* — Anthony J Weier
(74) *Attorney, Agent, or Firm* — K&L Gates LLP

(57) ABSTRACT

A coffee beverage in a container wherein same may be foamed by shaking to provide a pleasant aerated texture/mouthfeel.

20 Claims, 2 Drawing Sheets

PACKAGED AMBIENT COFFEE BEVERAGE WITH AERATED TEXTURE UPON HAND SHAKING

CROSS REFERENCE TO RELATED APPLICATIONS

The present application is a National Stage of International Application No. PCT/EP2017/054604, filed on Feb. 28, 2017, which claims priority to International Application No. PCT/CN2016/075198, filed on Mar. 1, 2016, the entire contents of which are being incorporated herein by reference.

TECHNICAL FIELD

The invention relates to a packaged coffee beverage, specifically an ambient beverage which exhibits stable, creamy, and aerated texture upon shaking by hand.

BACKGROUND OF THE INVENTION

Coffee beverages are one of the most widely-consumed drinks around the world and is a part of popular culture and social life. It's the most popular drink to start the day and when people need more energy.

Consumer are becoming more affluent and increasingly demanding when it comes to make choices for coffee. Especially the Carefree Trendies are seeking for new experiences in their beverage options.

Certain of these coffee based beverages with an aerated indulgent texture after shaking create a delight among consumers. Such foamy beverages are perceived to have a creamy and indulgent texture. It is also desirable to have aseptic shelf-life stable product with improved product aerated foamy mouthfeel and shelf-life stability.

Ready to drink coffee NESCAFE SHAKISSIMO was successfully launched in Europe. This product is a chilled coffee with a good foamability upon shaking by hand. However, it has a short shelf-life of about 70 days at chilled temperatures. There are several shortcomings to this, including the need to maintain the cold distribution chain at all times, including during transportation and storage. It cannot be stored at ambient temperatures for an extended time.

The inventors also have found that there exist several coffee-flavoured milk beverages. These beverages may contain low level of coffee and/or coffee flavors and does not create aerated beverages by hand shaking. In addition, these beverages have either a very watery mouthfeel or top foam such as Café Deli.

For example, US 2004/0228954 relates to flavoured milk manufacturing processes and compositions: this covers flavoured milk (coffee is mentioned as a flavour) but not RTD coffee. Moreover, aeration properties of this beverage are poor.

Another example, US 2007/0178213 relates to a stirred-style aerated yogurt which can be consumed as a flowable beverage. An aerating gas, nitrogen, is integrated in the product. U.S. Pat. No. 4,374,155 relates to a drinkable yogurt and milk preparation. This is also not RTD Coffee product and does not provide aerated texture upon hand shaking.

Protein aggregation is a big challenge for beverages produced with milk. It results in undesirable texture/mouthfeel, creates sandy, chalky, rough sensory perception. Another challenge when addressing sandiness is a large probability of reducing or even eliminating beverage foaming ability and decreasing aeration stability. Another challenge when reducing protein aggregation is creating a thin, watery texture, non-smooth and non-creamy mouthfeel. Therefore, there is a need for aseptic RTD coffee beverages that have good sensory perception without sandy mouthfeel as well as maintaining good foamability and stability at chilled and ambient temperatures.

The inventors have found it desirable to overcome or ameliorate at least one of the disadvantages of the prior art, or to provide a useful alternative. In particular, the inventors have set themselves to create a coffee beverage which is shelf-stable under ambient conditions and which can provide a pleasant foamy beverage upon shaking.

SUMMARY OF THE INVENTION

The invention overcomes undesirable texture/mouthfeel, sandy, chalky, rough sensory perception issues caused by protein aggregation during UHT treatment. As a result, it provides smooth, creamy indulgent texture/mouthfeel. It also provides good aeration upon hand shaking of the beverage in closed container. The product has consistent properties during shelf life, e.g. there are practically no viscosity and particle size distribution (PSD) changes during beverage shelf-life.

D[4,3] particle size of the RTD coffee beverages with indulgent, non-sandy, smooth mouthfeel of the beverage was found to be below 25 microns, while severe chalkiness/sandiness was perceived in the beverages with D[4,3] above 35 microns. The beverages having D[4,3] above 25 microns but below 35 microns showed slight sandiness.

In one embodiment, by evaluation of large number of different hydrocolloids and/or their combinations, buffers and chelators and other functional ingredients, it was surprisingly found that for a shelf-stable ready to drink coffee beverage comprising a coffee component and a dairy component ranging from 7.5 to 10.5 w/w % milk solids, only use of the specific stabilizing/texturizing system comprising sodium hexametaphosphate, sodium bicarbonate, a cellulose component, xanthan and gellan gums allowed us to provide a smooth indulgent texture/mouthfeel without chalkiness and/or sandiness caused by severe protein aggregation.

In another embodiment, by evaluation of large number of different hydrocolloids and/or their combinations, buffers and chelators and other functional ingredients, it was surprisingly found that for a shelf-stable ready to drink coffee beverage comprising a coffee component and a dairy component a dairy component above 10.5 w/w % up to 15 w/w % milk solids, only use of the specific stabilizing/texturizing system comprising sodium hexametaphosphate, sodium bicarbonate, a cellulose component ranging from 0.2 to 0.5 w/w %, carrageenan, dipotassium phosphate, potassium and gellan gum allowed us to provide a smooth indulgent texture/mouthfeel without chalkiness and/or sandiness caused by severe protein aggregation.

Moreover, it was surprisingly found that only the invented system with specific combination of functional ingredients and with specific concentration ranges provides the required stable, long lasting aeration and indulgent smooth texture/mouthfeel after product shaking.

In the present invention, the beverage comprises coffee ranging from 0.5 to 1.5 w/w %.

In one aspect of the invention, the invention proposes a process for preparing a foamy aseptic coffee beverage which comprises the step of 1) providing a packaged product comprising the beverage of the present invention, wherein said packaged product is optionally refrigerated, then 2) shaking said packaged product to obtain said foamy coffee beverage.

In another aspect, the invention proposes the use of a packaged product for preparing a foamy aseptic coffee beverage by shaking, wherein said packaged product consists essentially of a ready to drink coffee beverage in a closed container.

DETAILED DESCRIPTION OF THE INVENTION

Figure 1:
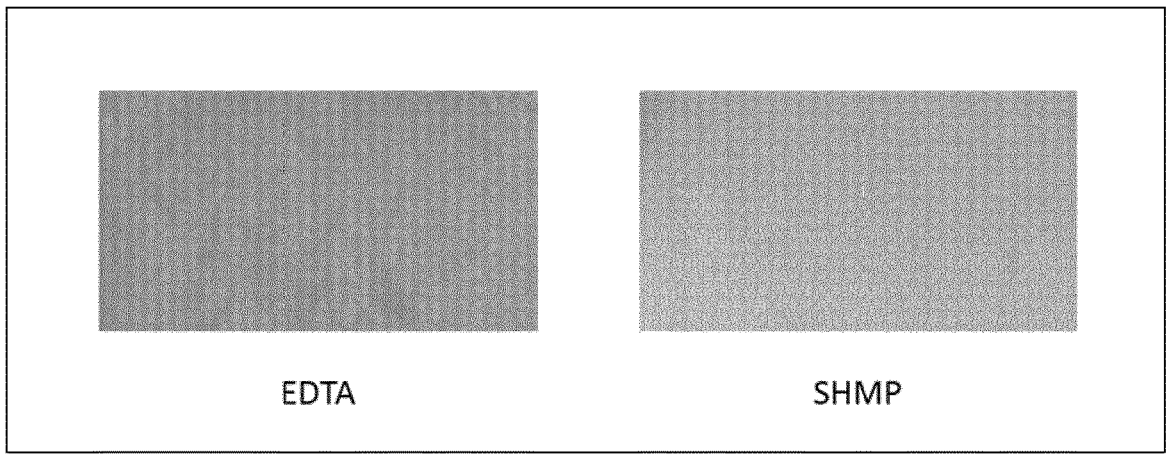
FIG. 1 shows visual appearance of coffee beverage containing sodium ethylenediaminetetraacetic acid (EDTA) or sodium hexametaphosphate (SHMP).

Unless noted otherwise, all percentages in the specification refer to weight percent (noted w/w %). The term w/w % represents weight/weight % of total RTD coffee beverage.

Unless defined otherwise, all technical and scientific terms have and should be given the same meaning as commonly understood by one of ordinary skill in the art to which this invention belongs, that of aseptic coffee beverages.

Unless defined otherwise, the term "aerated" applies to the entire beverage.

Unless defined otherwise, particle size was determined by the Malvern Mastersizer 3000 using laser diffraction technique. A particle size were calculated from measurements of the angular intensity of scattered light produced by a sample. In the invention, mean particle size is presented as volume mean diameter, D[4,3].

The beverage is suitable for preparing an aerated beverage by shaking it in the closed container. The consumer can then open the container to drink the aerated beverage directly from it. The consumer can also pour the aerated beverage from a bottle into another container such as glass or cup, for consumption.

Unless defined otherwise, the term "aerated" applies to the entire beverage containing gas bubbles after shaking. Gas is present in the headspace of a container and can comprise but not limited to air, nitrogen, argon or a combination of thereof.

Throughout the specification, an "aseptic beverage" refers to a beverage which is processed and filled under aseptic conditions into a container. "Shelf life" refers to the period of time after production of the beverage, during which the beverage is transported, and stored in retailers' or consumers' shelves, before consumption. The aseptic beverage has a shelf life of at least 6 months at ambient temperature. "Ambient temperature" ranges from 15° C. to 37° C. Preferably, the aseptic beverage has a shelf life of at least at least 2 months at 37° C., or 6 months at 30° C., or 9 months at 20° C.

In the present invention, the beverage comprises coffee ranging from 0.5 to 1.5 w/w %. Coffee component may be provided as liquid or viscous coffee concentrate, or as instant powdered coffee, such as spray-dried powdered coffee or freeze-dried powdered coffee, roast and ground coffee. Also coffee component may comprise coffee flavour.

The term "milk solids" refer to milk based products derived from different sources such as skim milk, whole milk, whole or skim milk powder, and cream. Other examples of suitable milk solids are casein, caseinate, casein hydrolysate, whey, whey hydrolysate, whey concentrate, whey isolate, milk protein concentrate, milk protein isolate, and combinations thereof. Furthermore, the milk protein may be, for example, sweet whey, acid whey, α-lactalbumin, β-lactoglobulin, bovine serum albumin, acid casein, caseinates, α-casein, β-casein and/or γ-casein. In a preferred embodiment, the beverage contains powder dairy ingredients.

In an embodiment, the beverage comprises a dairy component ranging from 7.5 to 10.5 w/w % milk solids. In another embodiment, the beverage comprises a dairy component above 10.5 w/w % up to 15 w/w % milk solids.

In an embodiment, the beverage comprises about or less than 4 w/w % of fat, such as milk fat from 0 to 4 w/w % of fat, preferably from 0 to 2.9 w/w % of milk fat, such as 1 w/w %, 1.5 w/w %, 2.5 w/w %, or 2.9 w/w % of milk fat.

In one embodiment, the carrageenan comprises iota, kappa, lambda or combinations thereof.

The sweetener component comprises a sweetener, such as sugar (sucrose) and/or a non-caloric sweetener. For instance, the beverage comprises from 0.5 to 6 wt % of sugar. "Added sugar" refers to caloric mono- and di-saccharides added during manufacture of the beverage, such as glucose, sucrose, maltose, fructose, or combination of thereof, which are not naturally found in the dairy component. For instance, lactose is naturally found in milk, therefore, for the purpose of this disclosure, lactose is not taken into account in "added sugar".

The flavour component provides flavour to the beverage, in addition to the milk flavour which comes from the dairy component. The flavour component comprises a flavour ingredient selected from cocoa, tea, caramel, vanilla, cinnamon, cardamom, saffron, clove, strawberry, banana and mixtures thereof.

In an embodiment of the present invention, the coffee beverage further comprises nut based components such as peanuts, almond, hazelnut, and cashew, or combination of thereof.

The functional components provide product thermal stability during UHT treatment, indulgent texture/mouthfeel, contributes to shelf-stability of the product at refrigeration and ambient temperatures, and helps creating the aerated texture/mouthfeel of the beverage after hand shaking.

In an embodiment of the present invention, for a coffee beverage comprising a dairy component ranging from 7.5 to 10.5 w/w % milk solids further comprising functional components such as sodium hexametaphosphate (SHMP) ranging from 0.02 to 0.05%; sodium bicarbonate ranging from 0.16 to 0.21%; a cellulose component ranging from 0.2 to 0.5%; xanthan ranging from 0.01 to 0.03%; and gellan gum ranging from 0.01 to 0.04 w/w %.

In an embodiment of the present invention, for a coffee beverage comprising a dairy component above 10.5 w/w % up to 15 w/w % milk solids; further comprising functional components such as sodium hexametaphosphate (SHMP) ranging from 0.02 to 0.05 w/w %; sodium bicarbonate ranging from 0.16 to 0.21 w/w %; a cellulose component ranging from 0.2 to 0.5 w/w %; carrageenan ranging from 0.005 to 0.02 w/w %; dipotassium phosphate ranging from 0.01 to 0.03 w/w %; potassium citrate ranging from 0 to 0.05 w/w %; and gellan gum ranging from 0.01 to 0.04 w/w %.

In an embodiment of the present invention, the cellulose comprises a blend of carboxymethyl cellulose and microcrystalline cellulose.

In another embodiment of the present invention, the gellan is high-acyl gellan.

In another embodiment of the present invention, the carrageenan comprises iota, kappa, lambda or combinations thereof.

As shown above, sodium hexametaphosphate is crucial to prevent protein aggregation during the UHT treatment.

Sodium hexametaphosphate is well known as a chelating agent with in RTD industry, and that SHMP is used in dairy beverages to prevent age gelation due to its chelating properties.

It was unexpectedly found that SHMP in combination with specific hydrocolloid system solves protein aggregation caused by UHT treatment issues which is completely different issue than age gelation. Thus, severe protein aggregation during UHT caused undesirable sensory perception, i.e. sandiness and chalkiness, and significantly reduced smoothness of RTD coffee beverage, and that we unexpectedly found that addition of SHMP solve this issue. If SHMP solves protein aggregation issues caused by UHT, we should observe the similar effect with other strong chelator, i.e. sodium ethylenediaminetetraacetic acid (EDTA). However, as mentioned above, it was surprisingly a found big difference between EDTA and SHMP even both are strong chelators, i.e. SHMP solves protein aggregation issues while EDTA does not. As you can see from visual observation (FIG. 1) and also from particle size distribution data (FIG. 2), severe protein aggregation occurs with EDTA but not with SHMP. Moreover, sensory evaluation showed a smooth texture/mouthfeel with SHMP and severe sandiness with EDTA. Moreover, addition of SHMP does not compromise aeration of the beverage after hand shaking.

The aseptic coffee beverage is manufactured by providing a standardised liquid milk composition, which comprises milk solids ranging from 7.5 to 10.5 w/w % or above 10.5 w/w % up to 15 w/w % milk solids. The mix composition may be prepared by mixing liquid skim milk, milk cream and skimmed milk powder, full fat milk powder or combination of thereof. Sweetener components such as sugar, flavour components, and functional components are also mixed into the liquid mix composition. For instance, mixing is done at about 70° C., during 30 minutes. The mixture sterilized 130-150° C. for 30-45 seconds. Sterilisation removes biological contamination from the mixture. Alternative heat-treatments are known to the person of ordinary skill in the art. Homogenizing the mixture at total pressure ranging from 200-300 bars and temperature ranging from 65-80° C. Homogenisation disperses the fat component and other ingredients. Then the beverage is cooled to 25° C. or below and filled into a container, such as a cup or a bottle. Filling is done under aseptic conditions. The container is then sealed. When the container is a bottle, sealing can be done with a standard screw lid. When the container is a cup, sealing can be done with a standard foil seal.

Rather than ensuring that the beverage retains a foamy texture over the whole shelf life, the inventors have now provided a non-foamy beverage which can be aerated by hand shaking and deliver a pleasant frothy texture during consumption. As mentioned, the aerated texture is obtained by shaking the beverage in its closed container, for instance by hand. Shaking by hand may be done by holding the container in the hand, and bending and stretching the arms several times, for instance from 3 to 20 times. Generally, about 5 to 10 movements are sufficient to generate a pleasant foamy texture in the beverage. The beverage retains pleasant aerated texture/mouthfeel at least 30 minutes after hand shaking of the refrigerated beverage at 4° C. For example, the beverage also retains pleasant aerated texture/mouthfeel at least 30 minutes after shaking of the refrigerated beverage at ambient temperature of 20° C.

An advantage is that there is no concern about shelf stability of the aeration. Only the shelf stability of the beverage before shaking is a concern. In an embodiment, the beverage is shelf-stable at ambient temperatures, for instance during 6 months at temperatures ranging from 15° C. to 30° C. Relatively long shelf stability of the beverage is achieved thanks to the unique texturing/stabilizing system that includes combination of hydrocolloids and emulsifiers and aseptic manufacturing conditions, together with sterilisation, of the beverage.

An example of a container is a cup. The cup has a bottom wall, a side wall, and a lid. Shaking the beverage disperses the headspace gas such as air as bubbles into the beverage. The composition of the beverage, in particular the specific combination of functional ingredients was developed so that the bubbles remain distributed in the whole volume of the beverage during consumption, and to provide a pleasant mouthfeel. The fact that the bubbles are distributed in the whole volume of the beverage provides a pleasant foamy texture. For instance, the refrigerated beverage retains an aerated texture during at least 30 minutes after shaking.

Assessment of the foamy texture is performed by a trained sensory panel, as explained in the examples below. The maximum period during which bubbles are retained in the beverage is not absolutely critical, as the main criteria is that there are bubbles in the product until the consumer has completely drunk the beverage. Ordinarily, such beverages are consumed in less than 30 minutes. Preferably, the beverage retains a foamy texture during at least 15, 20, 25, or 30 minutes.

The inventors have found that if the headspace is too small, then the closed container does not contain enough gas to provide a pleasant foamy texture upon shaking. For instance, it was found that a headspace of 15 by volume (vol %) was too low to provide a pleasant foamy texture after shaking. Therefore, the headspace represents preferably at least 18 vol % of the volume of the container.

On the other hand, if the headspace is too large, it may have several undesirable consequences. First, the consumer could consider that the container is not filled enough. Second, a large headspace for the same amount of the beverage can only be provided with a large container. This increases the cost of packaging and the amount of waste. Third, the inventors have found that if the headspace is too large, then the container tends to squash itself over shelf life. It was found that a good balance is achieved between these undesirable consequences, industrialisation considerations and the need to provide sufficient gas for aeration when the headspace represents up to 35 vol % of the volume of the container.

In an embodiment, the headspace represents from 18 to 35 vol % of the volume of the container. In other words, if the container has a volume of 100 mL, then the headspace represents from 18 mL to 35 mL, and the remainder is the beverage (65 mL to 82 mL). Preferably, the headspace represents from 20 to 32 vol % of the volume of the container, more preferably, from 30 to 32 vol % of the volume of the container.

In an embodiment, the cup contains one serving of the beverage. For instance, one serving of beverage represents from 80 to 220 mL of beverage before shaking.

When the container is a PET bottle, it may be desirable to provide it common strengthening features, such as ribs.

In an embodiment, the bottle has a volume of 240 ml. Preferably, the bottle contains one serving of the beverage. For instance, one serving represents from about 150 to 180 mL of beverage before shaking.

In another embodiment, the invention relates to a process for preparing an aseptic ready to drink coffee beverage comprising the steps of:
- Mixing of ingredients to dissolve the components in to a liquid state;
- Homogenizing the mixture at total pressure ranging from 200-300 bars and temperature ranging from 65-80° C.;
- Sterilizing at UHT conditions at 130-150° C. for 30-45 seconds
- Cooling the obtained beverage base product to 25° C. or below; and
- Filling aseptically UHT beverages in aseptic containers.

In another embodiment, the invention relates to a process for preparing an aseptic coffee beverage which comprises the steps of providing a packaged product as described above, then shaking the packaged product to obtain an aerated coffee beverage. Optionally, the packaged product may be refrigerated prior to shaking, so that the coffee beverage is chilled before consumption. The coffee beverage is then ready for hand shaking for consumption.

In another embodiment, the coffee beverage can be consumed at an ambient temperature.

As already mentioned, the beverage is shelf-stable at ambient temperatures. An advantage is that the packaged product may be stored at ambient temperatures, in warehouses, in shops or at home by consumers. In shops, a few containers can be stored in refrigerators for on-the-go consumption, so that the consumer can directly prepare a chilled aerated beverage by shaking. At home, consumers can keep the packaged product at ambient temperature and store a few containers in their refrigerator for consumption in the day for instance. This saves room in the refrigerator.

As mentioned, the aerated texture is obtained by shaking the beverage in the closed container, for instance by hand. Shaking by hand may be done by holding the container in the hand, and bending and stretching the arms several times, for instance from 3 to 20 times. Generally, about 5 to 10 movements are sufficient to generate a pleasant aerated texture in the beverage. When preparing the aerated beverage in that manner, the percent of air incorporated of 10 to 20 vol % can be achieved, usually of about 15 to 18 vol %.

The invention is further defined by reference to the following illustrative, non-limiting examples.

EXAMPLES

Example 1

A process for preparing an aseptic ready to drink coffee beverage comprising the steps of:
- Dissolving high heat milk powder in hot water (about 70° C.) in high shear mixer tank for 25 min in tank A
- Pumping reconstituted milk from tank A to mixer tank B
- Dissolving functional ingredients in hot water (about 70° C.) in high shear mixer tank A for 15 min
- Pumping liquefied functional ingredients from tank A to mixer tank B
- Mixing reconstituted milk and liquefied functional ingredients in tank B
- Pumping liquid from tank B through plate heat exchanger (PHE) to cool till ~10-15 C and store under low agitation in standardization tank C
- Dissolving coffee in water at 25-30° C. in high shear mixer tank D
- Transferring coffee solution to standardization tank C
- Pre-heating solution from standardization tank C to about 70° C. using PHE
- Passing the liquid through de-aerator
- Homogenizing at 170/50 bars
- Sterilizing by UHT at 135° C. for 30 sec
- Cooling to 20-25° C.
- And filling under aseptic conditions in 8 oz (about 236 mL) bottles having 30% headspace Example 2

An aseptic ready to drink coffee beverage was prepared as in Example 1 comprising a 10 w/w % milk solids, 1.2% w/w % coffee, 0.05% w/w % sodium hexametaphosphate, 0.2 w/w % sodium bicarbonate, 0.4 w/w % cellulose, 0.025 w/w % xanthan and 0.03 w/w % gellan gum.

Figure 2:
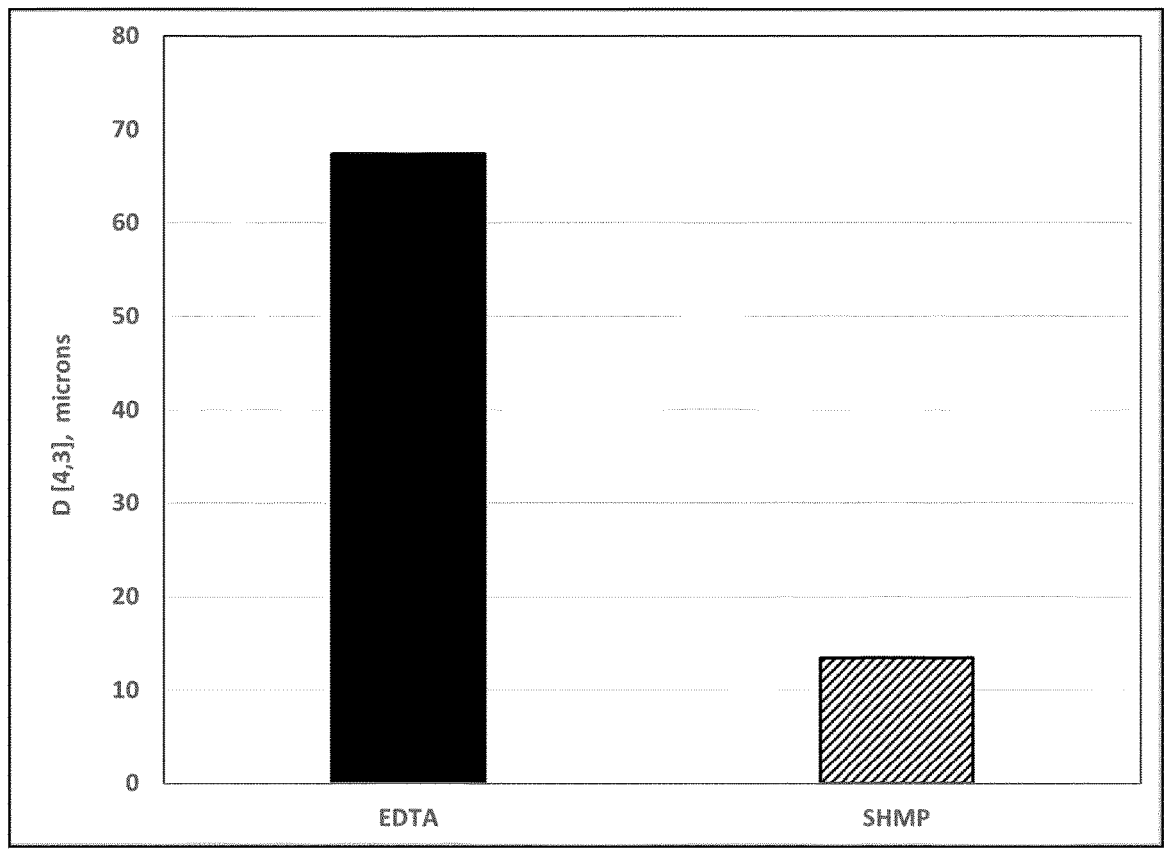
FIG. 2 shows mean particle size D[4,3] of coffee beverage containing EDTA or SHMP.

No aggregates were found by visual observation (FIG. 1, SHMP). Mean particle size D[4,3] was found to be below 20 microns (FIG. 2, SHMP). Unique indulgent, creamy smooth aerated texture/mouthfeel without sandiness and chalkiness was obtained by sensory evaluation after product hand shaking.

The beverage showed a good shelf life physical stability with no phase separation, gelation, sedimentation, or syneresis.

Example 3

An aseptic ready to drink coffee beverage was prepared as in Example 2 comprising EDTA instead of SHMP.

Severe protein aggregation were found by visual observation (FIG. 1, EDTA). Mean particle size D[4,3] (FIG. 2, EDTA) was found to be significantly higher as compared to that of beverages of Example 2. Sensory evaluation showed severe sandiness and chalkiness as well as significant reduction in smoothness of the beverage.

Example 4

An aseptic ready to drink coffee beverage was prepared as in Example 2 but without SHMP.

Severe protein aggregation were found by visual observation. Mean particle size D[4,3] (FIG. 3, A) was found to be significantly higher as compared to that of beverages of Example 2. Sensory evaluation showed severe sandiness and chalkiness as well as significant reduction in smoothness of the beverage.

Example 5

An aseptic ready to drink coffee beverage was prepared as in Example 1 comprising 12 w/w % milk solids, 1.2% w/w % coffee, 0.04 w/w % sodium hexametaphosphate, 0.18 w/w % sodium bicarbonate, 0.25 w/w % cellulose, 0.01 w/w % carrageenan, 0.02 w/w % dipotassium phosphate, and 0.015 w/w % gellan gum.

Figure 3:
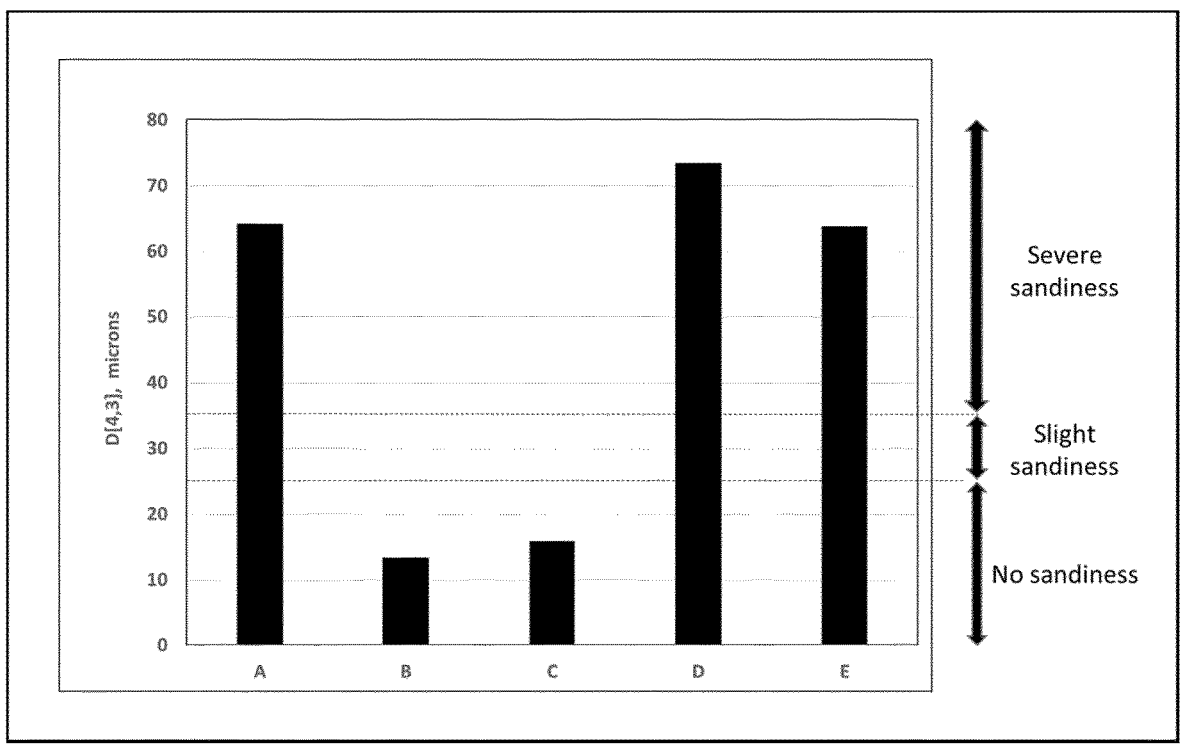
FIG. 3 shows mean particle size of coffee beverage.

No aggregates were found by visual observation. Mean particle size D[4,3] was found to be below 20 microns (FIG. 3, B). Unique indulgent, creamy smooth aerated texture/mouthfeel without sandiness and chalkiness was obtained by sensory evaluation after product hand shaking.

The beverage showed a good shelf life physical stability with no phase separation, gelation, sedimentation, or syneresis.

Example 6

An aseptic ready to drink coffee beverage was prepared as in Example 1 comprising 12 w/w % milk solids, 1.2% w/w % coffee, 0.04 w/w % sodium hexametaphosphate, 0.18 w/w % sodium bicarbonate, 0.25 w/w % cellulose, 0.01 w/w % carrageenan, 0.02 w/w % dipotassium phosphate, 0.015 w/w % gellan gum and 0.04 w/w % potassium citrate.

No aggregates were found by visual observation. Mean particle size D[4,3] was found to be below 20 microns (FIG. 3, C). Unique indulgent, creamy smooth aerated texture/mouthfeel without sandiness and chalkiness was obtained by sensory evaluation after product hand shaking.

The beverage showed a good shelf life physical stability with no phase separation, gelation, sedimentation, or syneresis.

Example 7

An aseptic ready to drink coffee beverage was prepared as in Example 4 but comprising 0.013 w/w % sodium bicarbonate.

Severe protein aggregation were found by visual observation. Mean particle size D[4,3] (FIG. 3, D) was found to be high (above 60 microns). Sensory evaluation showed severe sandiness and chalkiness as well as significant reduction in smoothness of the beverage.

Example 8

An aseptic ready to drink coffee beverage was prepared as in Example 4 but comprising 0.014 w/w % sodium bicarbonate.

Severe protein aggregation were found by visual observation. Mean particle size D[4,3] (FIG. 3, E) was found to be high (above 60 microns). Sensory evaluation showed severe sandiness and chalkiness as well as significant reduction in smoothness of the beverage.

The invention claimed is:

1. A shelf-stable ready to drink coffee beverage comprising, based on a total weight of the shelf-stable ready to drink coffee beverage:
   a coffee component ranging from 0.5 to 1.5 w/w %;
   a dairy component ranging from 7.5 to 10.5 w/w % milk solids;
   sodium hexametaphosphate (SHMP) ranging from 0.02 to 0.05 w/w %;
   sodium bicarbonate ranging from 0.16 to 0.21 w/w %;
   a cellulose component ranging from 0.2 to 0.5 w/w %;
   xanthan ranging from 0.01 to 0.03 w/w %; and
   gellan gum ranging from 0.01 to 0.04 w/w %.

2. A shelf-stable ready to drink coffee beverage comprising, based on a total weight of the shelf-stable ready to drink coffee beverage:
   a coffee component ranging from 0.5 to 1.5 w/w %;
   a dairy component above 10.5 w/w % up to 15 w/w % milk solids;
   sodium hexametaphosphate (SHMP) ranging from 0.02 to 0.05 w/w %;
   sodium bicarbonate ranging from 0.16 to 0.21 w/w %;
   a cellulose component ranging from 0.2 to 0.5 w/w %; and
   carrageenan ranging from 0.005 to 0.02 w/w %;
   dipotassium phosphate ranging from 0.01 to 0.03 w/w %;
   potassium citrate ranging from 0 to 0.05 w/w %; and
   gellan gum ranging from 0.01 to 0.04 w/w %.

3. The shelf-stable ready to drink coffee beverage of claim 1, wherein the cellulose component comprises a blend of carboxymethyl cellulose and microcrystalline cellulose.

4. The shelf-stable ready to drink coffee beverage of claim 1, wherein the gellan gum is high-acyl gellan.

5. The shelf-stable ready to drink coffee beverage of claim 2, wherein the carrageenan is selected from the group consisting of iota, kappa, lambda and combinations thereof.

6. The shelf-stable ready to drink coffee beverage of claim 1, further comprising a sweetener component.

7. The shelf-stable ready to drink coffee beverage of claim 6, wherein the sweetener component comprises sugar ranging from 0.5 to 5 w/w % based on the total weight of the beverage.

8. The shelf-stable ready to drink coffee beverage of claim 1, wherein the shelf-stable ready to drink coffee beverage retains an aerated texture for at least 30 minutes after shaking.

9. The shelf-stable ready to drink coffee beverage of claim 2, wherein the cellulose component comprises a blend of carboxymethyl cellulose and microcrystalline cellulose.

10. The shelf-stable ready to drink coffee beverage of claim 2, wherein the gellan gum is high-acyl gellan gum.

11. The shelf-stable ready to drink coffee beverage according to claim 2, further comprising a sweetener component.

12. The shelf-stable ready to drink coffee beverage according to claim 11, wherein the sweetener component comprises sugar ranging from 0.5 to 5 w/w % based on the total weight of the beverage.

13. The shelf-stable ready to drink coffee beverage according to claim 2, wherein the shelf-stable ready to drink coffee beverage retains an aerated texture for at least 30 minutes after shaking.

14. The shelf-stable ready to drink coffee beverage of claim 1, wherein the shelf-stable ready to drink coffee beverage contains particles having a mean particle size D[4,3] below 25 microns.

15. The shelf-stable ready to drink coffee beverage of claim 2, wherein the shelf-stable ready to drink coffee beverage contains particles having a mean particle size D[4,3] below 25 microns.

16. The shelf-stable ready to drink coffee beverage of claim 2, wherein the shelf-stable ready to drink coffee beverage contains particles having a mean particle size D[4,3] below 20 microns.

17. A process for preparing an aseptic coffee beverage with aerated texture after shaking by hand, the process comprising:
   i) providing a packaged product with a headspace from 20-35 volume % of the packaged product, the packaged product comprising a beverage, the beverage comprising: based on a total weight of the beverage, a coffee component ranging from 0.5 to 1.5 w/w %; a dairy component ranging from 7.5 to 10.5 w/w % milk solids; sodium hexametaphosphate (SHMP) ranging from 0.02 to 0.05 w/w %; sodium bicarbonate ranging from 0.16 to 0.21 w/w %; a cellulose component ranging from 0.2 to 0.5 w/w %; xanthan ranging from 0.01 to 0.03 w/w %; and gellan gum ranging from 0.01 to 0.04 w/w %, and
   ii) shaking the packaged product to obtain the aseptic coffee beverage with the aerated texture.

18. The process of claim 17, wherein the shaking is performed by hand.

19. The process of claim 18, wherein the shaking by hand is performed by shaking the closed container from 3 to 20 times.

20. A process for preparing an aseptic coffee beverage with aerated texture after shaking by hand, the process comprising:
  i) providing a packaged product with a headspace from 20-35 volume % of the packaged product, the packaged product comprising a beverage, the beverage comprising: based on a total weight of the beverage, a coffee component ranging from 0.5 to 1.5 w/w %; a dairy component above 10.5 w/w % up to 15 w/w % milk solids; sodium hexametaphosphate (SHMP) ranging from 0.02 to 0.05 w/w %; sodium bicarbonate ranging from 0.16 to 0.21 w/w %; a cellulose component ranging from 0.2 to 0.5 w/w %; and carrageenan ranging from 0.005 to 0.02 w/w %; dipotassium phosphate ranging from 0.01 to 0.03 w/w %; potassium citrate ranging from 0 to 0.05 w/w %; and gellan gum ranging from 0.01 to 0.04 w/w %, and
  ii) shaking the packaged product to obtain the aseptic coffee beverage with the aerated texture.

\* \* \* \* \*